(12) United States Patent
Tanaka et al.

(10) Patent No.: US 7,146,257 B2
(45) Date of Patent: Dec. 5, 2006

(54) ELECTRIC POWER PLANT GENERAL CONTROL SYSTEM

(75) Inventors: Toshihiko Tanaka, Kanagawa-ken (JP); Hiroshi Fukuda, Tokyo (JP); Jin Murata, Kanagawa-ken (JP); Toshihiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/508,545

(22) PCT Filed: Mar. 28, 2003

(86) PCT No.: PCT/JP03/03980

§ 371 (c)(1),
(2), (4) Date: Apr. 12, 2005

(87) PCT Pub. No.: WO03/083591

PCT Pub. Date: Oct. 9, 2003

(65) Prior Publication Data

US 2005/0228545 A1    Oct. 13, 2005

(30) Foreign Application Priority Data

Mar. 28, 2002 (JP) .............................. 2002-090294

(51) Int. Cl.
*G06F 17/00* (2006.01)
*G06F 19/00* (2006.01)

(52) U.S. Cl. ................... 700/286; 700/287; 307/11; 307/38; 307/113; 361/189

(58) Field of Classification Search ............... 700/286, 700/287; 307/11, 38, 113; 361/189
See application file for complete search history.

(56) References Cited

U.S. PATENT DOCUMENTS 3,898,441 A * 8/1975 Davis et al. ................. 700/287
5,258,652 A   11/1993 Nigawara et al.

6,311,105 B1 * 10/2001 Budike, Jr. ................. 700/291
6,633,823 B1 * 10/2003 Bartone et al. ............... 702/57

(Continued)

FOREIGN PATENT DOCUMENTS

JP            61-173306        8/1988

(Continued)

OTHER PUBLICATIONS

"A Microprocessor Based Power Plant Monitor & Control System Having Total Rectifier Diagnostic Capability" —Rousso et al, Northern Telecom Canada Limited, 1988, IEEE.*

(Continued)

*Primary Examiner*—Michael D. Masinick
(74) *Attorney, Agent, or Firm*—Oblon, Spivak, McClelland, Maier & Neustadt, P.C.

(57) ABSTRACT

An electric power plant general control system for controlling power generating units. A generating unit ($GU_2$) can operate part of the auxiliaries based on an automation command outputted from a unit computer ($UC_2$) having a sequence function portion. The generating unit operates the remaining part of the auxiliaries based on an operation command outputted from an operation board ($OB_2$) without a sequence function portion, the operation board disposed separately from the unit computer. A general automation computer (GAC) is connected with an upper system of the unit computer, and an operator command is inputted from an interactive apparatus ($I/F_4$). The general control system is provided with a mock-up portion (Moc) equivalent to the sequence function portion disposed on the side of the auxiliaries controlled by the automation command outputted from the unit computer. The operation signal from the general automation computer is outputted to the unit computer and the operation board.

8 Claims, 17 Drawing Sheets

U.S. PATENT DOCUMENTS

| | | | |
|---|---|---|---|
| 6,678,585 B1* | 1/2004 | Havener | 700/295 |
| 6,832,134 B1* | 12/2004 | Havlena | 700/291 |
| 6,898,488 B1* | 5/2005 | Kusaka et al. | 700/286 |
| 6,912,889 B1* | 7/2005 | Staphanos et al. | 73/23.31 |
| 6,947,813 B1* | 9/2005 | Sugihara et al. | 700/286 |
| 6,980,891 B1* | 12/2005 | Nagafuchi et al. | 700/286 |
| 2003/0229405 A1* | 12/2003 | Sugihara et al. | 700/17 |
| 2004/0102872 A1* | 5/2004 | Schick et al. | 700/286 |
| 2006/0178762 A1* | 8/2006 | Wroblewski et al. | 700/30 |

FOREIGN PATENT DOCUMENTS

| | | |
|---|---|---|
| JP | 5-250010 | 9/1993 |
| JP | 11-39023 | 2/1999 |
| JP | 11-356094 | 12/1999 |
| JP | 2001-273031 | 10/2001 |
| JP | 2002-215227 | 7/2002 |

OTHER PUBLICATIONS

"A Reconfigurable Hybrid System and Its Application to Power Plant Control" —Garcia et al, IEEE Transactions on Control Systems Technology, vol. 3, No. 2, Jun. 1995.*

* cited by examiner

ELECTRIC POWER PLANT GENERAL CONTROL SYSTEM

FIELD OF THE INVENTION

The present invention relates to an electric power plant control system controlling generally operation of a plurality of power generating units.

BACKGROUND OF THE TECHNOLOGY

Operation of electric power plants has ever been carried out for each individual power generating unit in an electric power plant. For example, each power generating unit is allotted with a group of operators including 5 to 6 persons (watchkeepers) with work shift so as to cope quickly with occurrence of abnormal situation of the power generating unit. Automation of the operation of electric power plants has progressed with times, so that number of maintenance workers for the power generating unit can have been surely cut down.

However, there still remains a tendency that number of necessary persons increases in proportion to the scale of electric power plant (number of power generating units) because the operation control form per each power generating unit still comes to stay incorrigibly.

To remedy the situation mentioned above, a general control system for electric power plants has been proposed (refer to the Japanese Laid Open Patent No. Hei-11-356094). The system can prosecute effectively and safely the operation of a plurality of power generating units in a plurality of electric power plants, which has ever been carried out so far per power generating unit, with less work force system by operating generally these power generating units.

However, even in the case where such a latest general control system for electric power plants is actually introduced, all power generating units are not constructed newly but some existing power generating units are combined with new units in most cases.

FIG. 8 is a construction diagram of a traditional operation generalizing system showing the feature mentioned above. $GU_1$, $GU_2$ and $GU_3$ are called No. 1 machine, No. 2 machine and No. 3 machine, respectively, for the sake of convenience, which are existing separate power generating units. To avoid the figure being complicated, the main machine is omitted and valves to be operated, regulating valves and a part of pumps are shown diagrammatically in this diagram. In the description of the present invention, the valve to be operated, the regulating valves, the pumps, etc. are hereafter called "auxiliaries".

By the way, automatic control levels of these power generating units $GU_1$, $GU_2$ and $GU_3$ are to be different from each other as follows. Namely, the power generating unit $GU_1$ of the No. 1 machine is an example of so-called full automatic control power generating units provided with automatic control programs to control automatically all sorts of auxiliaries in the power generating unit. The power generating unit $GU_2$ of the No. 2 machine is an example of power generating units having an automation level less than that of the power generating unit $GU_1$, to show an example in which a part of the auxiliaries are excluded from the object of automatic control and controlled manually instead. The power generating unit $GU_3$ of the No. 3 machine shows an example of power generating units whose auxiliaries are not automatically operated with a computer, i.e. a power generating unit without automatic control program.

These power generating units $GU_1$, $GU_2$ and $GU_3$ are configured so as to be operated with interactive apparatus (man-machine interface) $I/F_{1a}$, $I/F_{2a}$, $I/F_{3a}$ and operation boards $OB_{2a}$, $OB_{3a}$ in a concentrated operation room (COR) located at a place far from the electric power plants. In this case, the interactive apparatus $I/F_{1a}$ is located corresponding to the power generating unit $GU_1$; the interactive apparatus $I/F_{2a}$ and the operation board $OB_{2a}$ are located corresponding to the power generating unit $GU_2$; and the interactive apparatus $I/F_{3a}$ and the operation board $OB_{3a}$ are located corresponding to the power generating unit $GU_3$. The operators engaged in operation of the No. 1 machine to No. 3 machine are 6 persons except for the operators in the concentrated operation room.

Hereinafter, abstract of operation of the power generating units from the No. 1 machine to the No. 3 machine will be explained one by one starting from the power generating unit $GU_1$ of the No. 1 machine.

The unit computer $UC_1$ of the No. 1 machine has a full automatic control program. The mechanism thereof is that an automation command $In_{a1}$ to be prosecuted is outputted based on the operating condition of the plant at that time to operate the power generating unit $GU_1$ when the operator $OP_1$ inputs an operator command $In_1$ through the interactive apparatus $I/F_1$ or through the interactive apparatus $I/F_{1a}$ located in the concentrated operation room COR.

The power generating unit $GU_1$ is configured in such a manner as to start, stop or open/close all the auxiliaries necessary for the operation of the power generating unit $GU_1$ from the unit computer $UC_1$ directly or via the control units $CU_{1a}$, $CU_{1b}$. In other words, a motor drive valve $MDV_{1q}$ and a regulation valve $RV_1$ are controlled by the control unit $CU_{1a}$; a pump $P_1$ is operated by the control unit $CU_{1b}$; and a motor drive valve $MDV_{1b}$ is directly operated by the unit computer $UC_1$ through a relay board (not shown) constituting an interlock circuit.

The control units $CU_{1a}$, $CU_{1b}$ are set up in such a manner as to control the auxiliaries in the power generating unit $GU_1$ by executing the program based on the automation command $In_{a1}$ when the command is inputted from the unit computer $UC_1$.

The automatic control program of the unit computer $UC_1$ is set up so as to operate sequentially necessary auxiliaries by dividing the start and the stop into a plurality of breakpoints as described later. That is to say, the program is configured as follows: each time a breakpoint has finished, the operator $OP_1$ is informed of the above matter through the screen of the display device of the interactive apparatus $I/F_1$, and then the operator $OP_1$ checks it and presses a progress permission button to make progress toward the next breakpoint.

FIG. 9 is a circuit diagram showing part of a plurality of breakpoints according to this automatic control program, and explanation thereof will be hereinafter carried out referring to this circuit diagram. A steam turbine power generating unit is employed here as an example. First of all, when ① "seawater system starting breakpoint" has finished (logic signal "1" is outputted), ② "condensate blow permissive condition" has been established (logic signal "1" is outputted), ③ "condensate blow operation check PB" being "ON" state (logic signal "1" is outputted) and the "AND" condition is established. Then, ④ "condensate blow command" is outputted to the control units $CU_{1a}$, $CU_{1b}$.

Thereafter, ⑤ "condensate blow" has finished (logic signal "1" is outputted), then ⑥ "condensate circulation vacuum rising permissive condition" has been established (logic signal "1" is outputted), and further the operator OP supplies permission for proceeding, i.e. ⑦ "condensate circulation vacuum rising operation check PB" is turned ON (logic signal "1" is outputted), so that "AND condition" is effected, and ⑧ "condensate circulation vacuum rising command" is outputted to the control units $CU_{1a}$, $CU_{1b}$.

In the explanation described above, "permission for proceeding" by the operator $OP_1$ corresponds to the "condensate blow operation check push button (PB)" being turned on. Breakpoints of the automatic control program of the unit computer $GU_1$ proceed in sequence like the above.

FIG. 10 is a diagram showing one example of the sequence in which the operation screen is switched over in accordance with the automatic control program. The unit computer $GU_1$ displays various screens starting from "Screen 1: seawater system start breakpoint" and getting to "Screen 30: starting finished" via "Screen 2: condensate blow breakpoint", "Screen 3: condensate circulation vacuum rising", "Screen 4: deaerator blow", and thereafter respective screens in serial order of the screen number on the display screen of the interactive apparatus $I/F_1$. In FIG. 10, the "rub check" of Screen 17 means check of rubbing degree of impeller blades. The "FA" of the screen 27 means full arc admission mode of steam toward the turbine, and the "PA" means partial admission of steam toward the turbine.

Returning to FIG. 8, abstract of the operation for the power generating unit $GU_2$ side of the No. 2 machine will be explained.

The unit computer $UC_2$ of the No. 2 machine has an automatic control program therein like the unit computer $UC_1$ of the No. 1 machine. The mechanism thereof is as follows: when an operator command $In_2$ by the operator $OP_2$ is inputted through the interactive apparatus $I/F_2$ or an operator command In is inputted through the interactive apparatus $I/F_{2a}$ located in the concentrated operation room COR, an automation command $In_{a2}$ is outputted to the power generating unit $GU_2$ by judging the automation command to be prosecuted based on the operating condition of the plant at that time.

The operator command In outputted from the operation board $OB_{2a}$ located in the concentrated operation room COR is to be inputted into the power generating unit $GU_2$ in conjunction with the output of the operation board $OB_2$.

The power generating unit $GU_2$ of the No. 2 machine is configured as follows: though a part of the auxiliaries necessary for operation are operated from the unit computer $UC_2$ through the control units $CU_{2a}$ and $CU_{2b}$, a part of the remaining auxiliaries e.g. motor drive valve $MDV_{2b}$ are operated by the operation board $OB_{2a}$ in the vicinity of the unit or the operation board $OB_2$ in the concentrated operation room COR, without the aid of operation of the unit computer $UC_2$ and independent of the interactive apparatus $I/F_2$ and $I/F_{2a}$. The operators $OP_{2a}$ and $OP_{2b}$ are described as different persons in FIG. 8, but may be one person.

FIG. 11 shows automation operation screen pages for explaining breakpoints of the power generating unit $GU_2$ of the No. 2 machine, and the screen page numbers 15, 16, and so on, up to 30 correspond to the screen page numbers of FIG. 10. In this case, each breakpoint proceeds sequentially based on the automatic control program of the unit computer $UC_2$ like the aforementioned power generating unit $GU_1$. However, the operator $OP_{2b}$ carries out manually the operations corresponding to the breakpoints from "Screen 1: seawater system start breakpoint" to "Screen 14: temperature rising/pressure rising breakpoint", and the operations corresponding to the breakpoints "Screen 28: output power increase 2" and "Screen 29: output power increase 3" of FIG. 10 through the operation board $OB_2$ or at the sites thereof, so that these operations are eliminated from the automatic control program.

Returning to FIG. 8 again, operation of the power generating unit $GU_3$ that is the No. 3 machine will be explained. As described above, the unit computer $UC_3$ does not have the automatic control program to operate automatically the auxiliaries, but has a function monitoring the condition of the plant and a function preparing logs such as daily reports out of the condition signals of the plant, so-called "data logger" as the main functions thereof.

In consequence, in the case of the power generating unit $GU_3$, the unit computer is configured to carry out operations corresponding to the operations at all breakpoints in the power generating unit $GU_1$ of the No. 1 machine, by outputting the operation signals toward the control units $CU_{3a}$, $CU_{3b}$ through the operation board $OB_3$ by the operator $OP_{3b}$ in the operation room or operating the manual valve $MV_3$ by the operator $OP_3$ at the site.

FIG. 12 is a diagram showing the automation operation screen at the start time of the power generating unit $GU_3$. The same screens as those of FIG. 10 are represented by the same marks and the explanation thereof will be omitted. In the case of the No. 3 machine, the operations from "Screen 15: aeration arrangement" to "Screen 22: acceleration 3" and the operation "Screen 30: turbine start" are carried out by the control units $CU_{3a}$, $CU_{3b}$ based on the command from the operation board $OB_3$, and the remaining operations from "Screen 1: seawater system start" to "Screen 14: temperature rising/pressure rising" and the operations from "Screen 23: rating retention parallel-in" to "Screen 29: output increasing" are carried out manually by the operator $OP_{3c}$.

In the conventional technologies as mentioned above, man-machine interfaces of the system are different from each other in general for each power generating unit because the automatic control levels of the power generating units are different from each other if the construction times thereof are different even though they have been equipped in the same electric power plant.

In the meantime, the conventional technologies mentioned above can provide at the utmost with a system prosecuting operation of a plurality of power generating units, and difference of the man-machine interfaces of the different automatic control systems among respective power generating units is left as it is.

As a result, operators of the concentrated operation room COR must remember different operation methods for each power generating unit to prosecute an appropriate operation without wrong operation or false recognition. This leads to increment of the operator's load or deterioration of operating effectiveness.

The present invention is intended to provide an electric power plant general control system that can operate effectively and safely a plurality of power generating units with fewer operators by forming a system which can operate generally every power generating unit even if the automatic control level for every power generating unit is different from each other.

DISCLOSURE OF THE INVENTION

To achieve the object mentioned above, an electric power plant general control system of a first aspect of the present invention comprises: a power generating unit in which a part of auxiliaries are operated based on an automation command outputted from a unit computer having a sequence function portion and the remaining part of the auxiliaries are operated based on an operation command outputted from an operation board, which does not have a sequence function portion, disposed separately from the unit computer; and a general automation computer connected with an upper system of the unit computer and making an operator command inputted thereinto from an interactive apparatus. The general control system is configured so as to output an operation signal into the unit computer through the general automation computer based on the operator command inputted from the interactive apparatus. The electric power plant general control system is further configured to be provided with a mock-up portion equivalent to the sequence function portion disposed on the side of the auxiliaries controlled by the automation command outputted from the unit computer, in a control system of the side of the auxiliaries controlled by the operation command from the operation board; being configured to be able to output the operation signal outputted from the general automation computer into both the unit computer and the operation board. The general control system is configured to operate generally the auxiliaries of the power generating unit.

According to this aspect of the present invention, even in an electric power plant where a part of auxiliaries are automatically controlled by a unit computer and the remaining auxiliaries are controlled manually by an operator using an operation board, general control from the concentrated operation room is available by providing the manual control system with a mock-up portion corresponding to the sequencer function portion provided in the automatic control system.

The electric power plant general control system of the second aspect of the present invention comprises a first power generating unit whose all auxiliaries are operated based on an automation command outputted from a first unit computer; a second power generating unit in which a part of auxiliaries are operated based on an automation command outputted from a second unit computer and the remaining part of the auxiliaries are operated based on an operation command from an operation board disposed separately from the second unit computer; and a general automation computer connected with an upper system of the first and the second unit computers and making an operator command inputted thereinto from an interactive apparatus; and being configured so as to output an operation signal into the first and the second unit computers through the general automation computer based on the operator command inputted from the interactive apparatus. The electric power plant general control system is further configured to be provided with a mock-up portion equivalent to the sequence function portion disposed on the side of the auxiliaries controlled by the automation command outputted from the first or the second unit computer out of the auxiliaries of the first and the second power generating units, in the controlling system of the side of the auxiliaries controlled by the operation command from the operation board. The general control system is configured to be able to output the operation signal outputted from the general automation computer into both the first and the second unit computers and the operation boards; and is configured to operate generally the auxiliaries of the first and the second power generating units.

According to this aspect of the present invention, even in a case where a power generating unit of so-called full automatic type where all of auxiliaries are automatically controlled by a unit computer, and a power generating unit of so-called low level automation type where a part of auxiliaries are controlled by a unit computer and the remaining part of the auxiliaries are controlled manually by an operator using an operation board are combined, general control of both power generating units from the concentrated operation room is available by providing the manual control system with a mock-up portion corresponding to the sequencer function portion provided in the automatic control system.

The electric power plant general control system of the third aspect of the present invention comprises: a first power generating unit whose auxiliaries are operated based on an automation command outputted from a unit computer; an operation board outputting an operation command to the auxiliaries; a second power generating unit having auxiliaries excluded from automatic control and operated based on an operation command outputted from the operation board; a general automation computer connected with an upper system of the unit computer and outputting an operation signal based on an operator command inputted from an interactive apparatus; and a center-site linkage support terminal unit outputting information representing operation contents regarding the auxiliaries excluded from automatic control based on an operation signal outputted from the general automation computer. The electric power plant general control system is further configured to be provided with a mock-up portion equivalent to the sequencer function portion of the side of the unit computer, on the side of the general automation computer, so as to output information representing the operation contents regarding the auxiliaries on the center-site linkage support terminal unit through the mock-up portion, and is configured so as to control generally the auxiliaries of the first and the second power generating units by the operation signal outputted from the general automation computer.

According to this aspect of the present invention, even in a case where a power generating unit of so-called full automatic type where all of auxiliaries are automatically controlled by a unit computer and a power generating unit whose all auxiliaries are controlled manually by an operator with an operation board, a full automatic power generating unit and a power generating unit whose all auxiliaries are controlled manually by an operator with an operation board are able to be controlled generally from a concentrated operation room because a mock-up portion corresponding to a sequencer portion provided in the automatic control system is provided in the general automation computer of the concentrated operation room and the center-site linkage support terminal unit outputs an operation command contents to an operator to input an operation result.

THE BEST EMBODIMENTS FOR EXECUTING THE INVENTION

Figure 1:
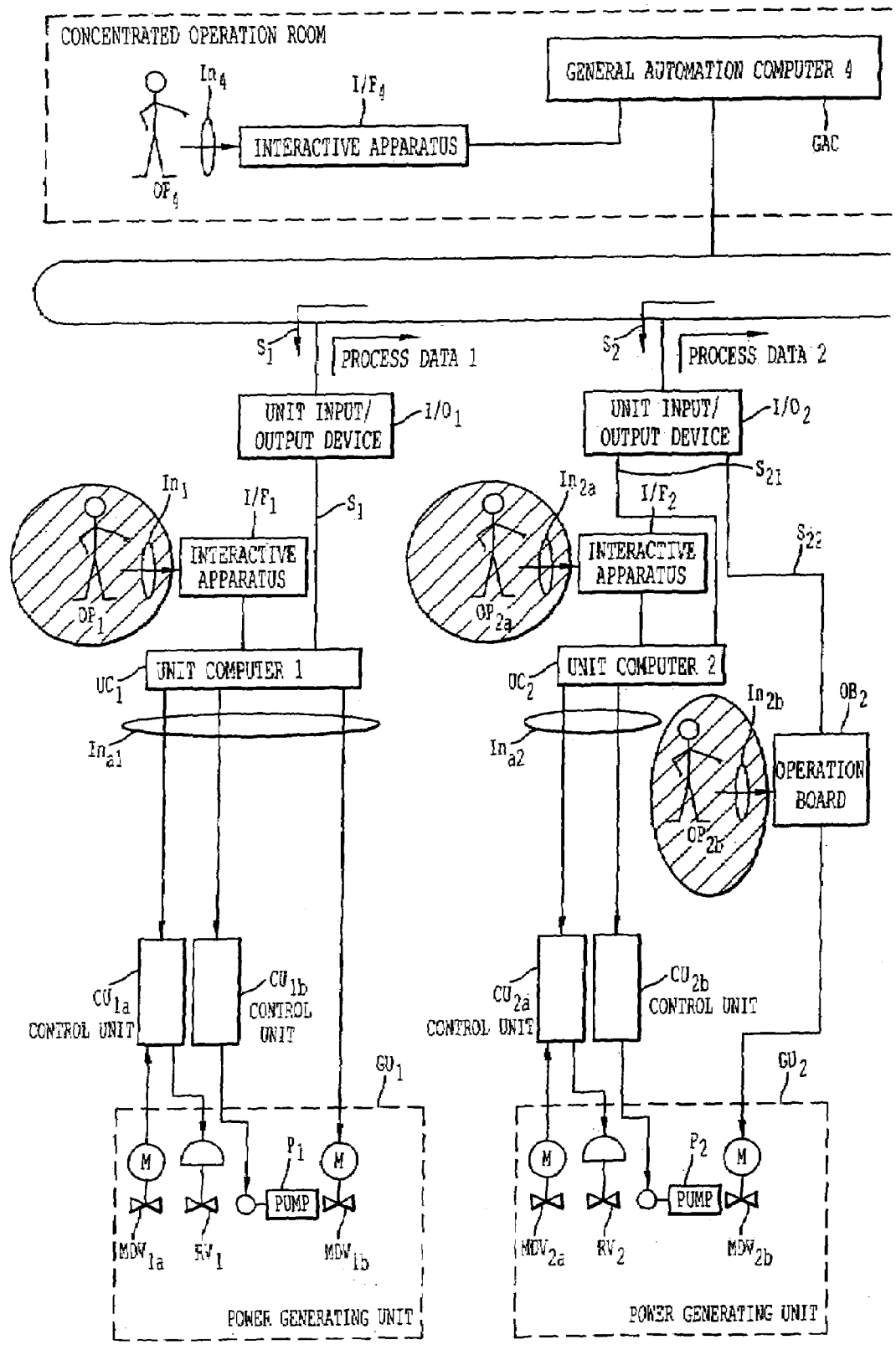
FIG. 1 is a system configuration diagram showing an embodiment of the electric power plant general control system relating to the present invention.
Figure 1:
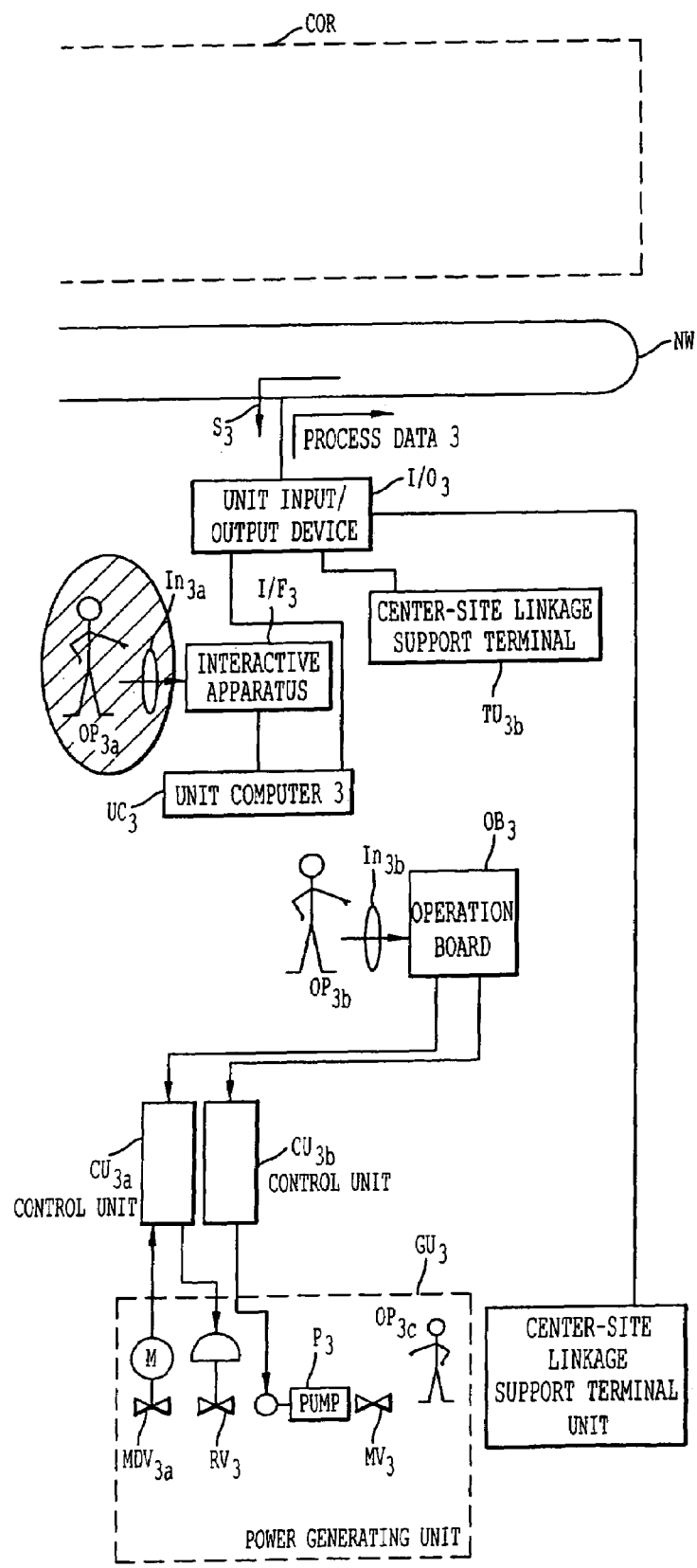

Embodiments of the present invention will be explained hereinafter referring to the drawings. For elements common to or similar to the conventional technologies, or elements common to or similar to each other are denoted by the same marks and repeated explanations thereof will be avoided.

FIG. 1 is a system configuration diagram showing an embodiment of the electric power plant general control system according to the present invention.

Figure 8:
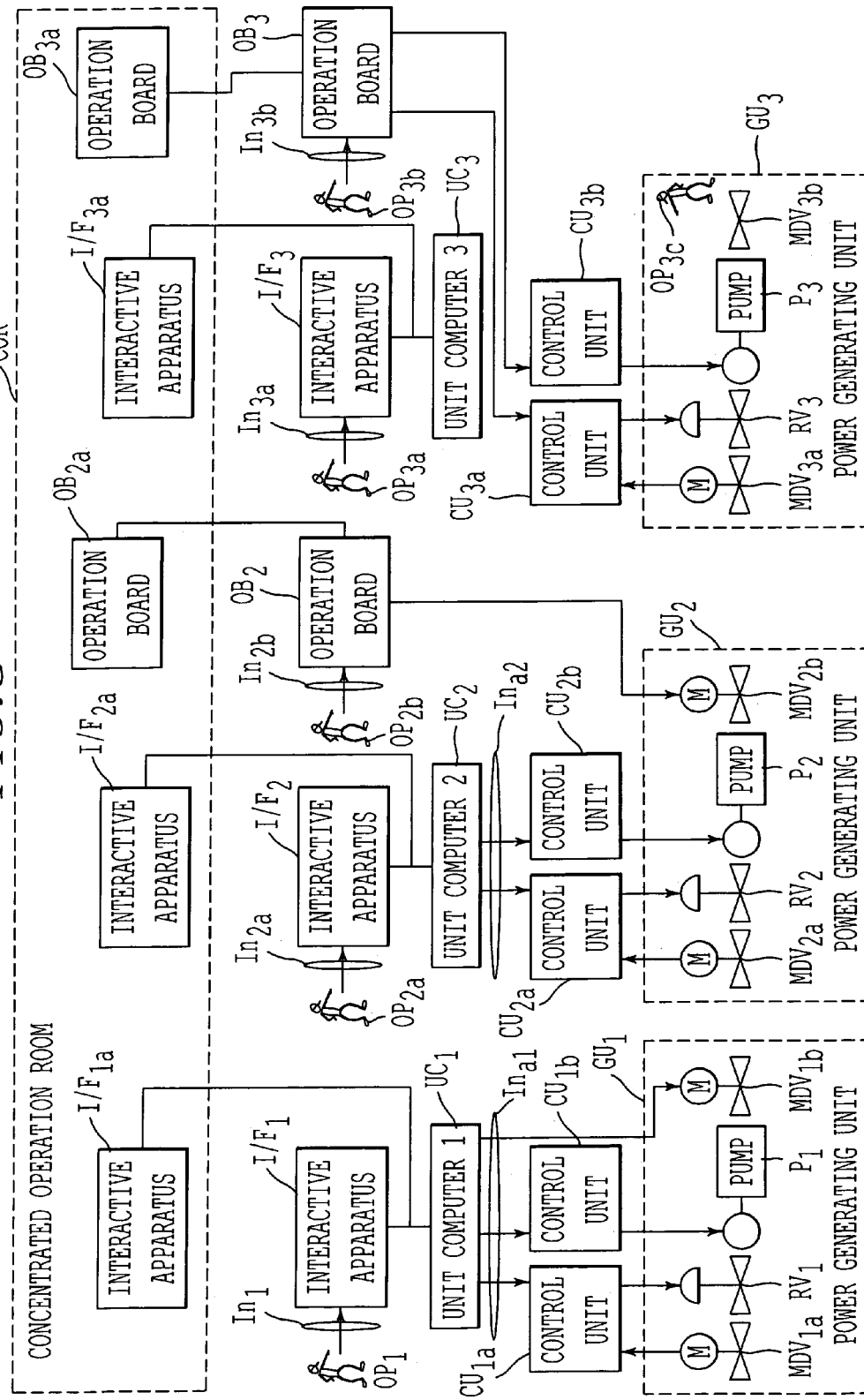
FIG. 8 is a system configuration diagram showing an example of the conventional electric power plant general control system.
Figure 9:
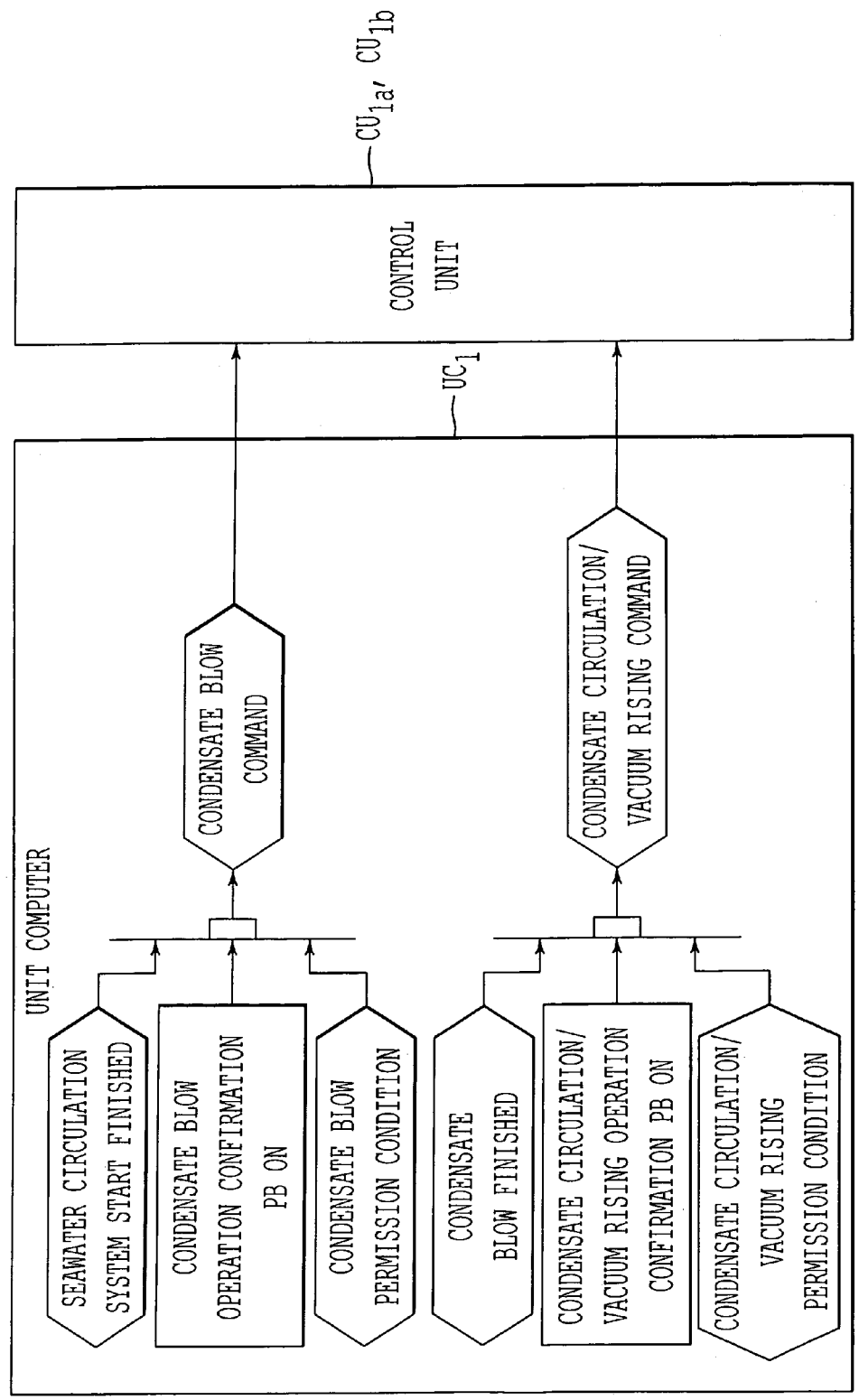
FIG. 9 is a sequence diagram showing an example of the breakpoints in the conventional device.
Figure 10:
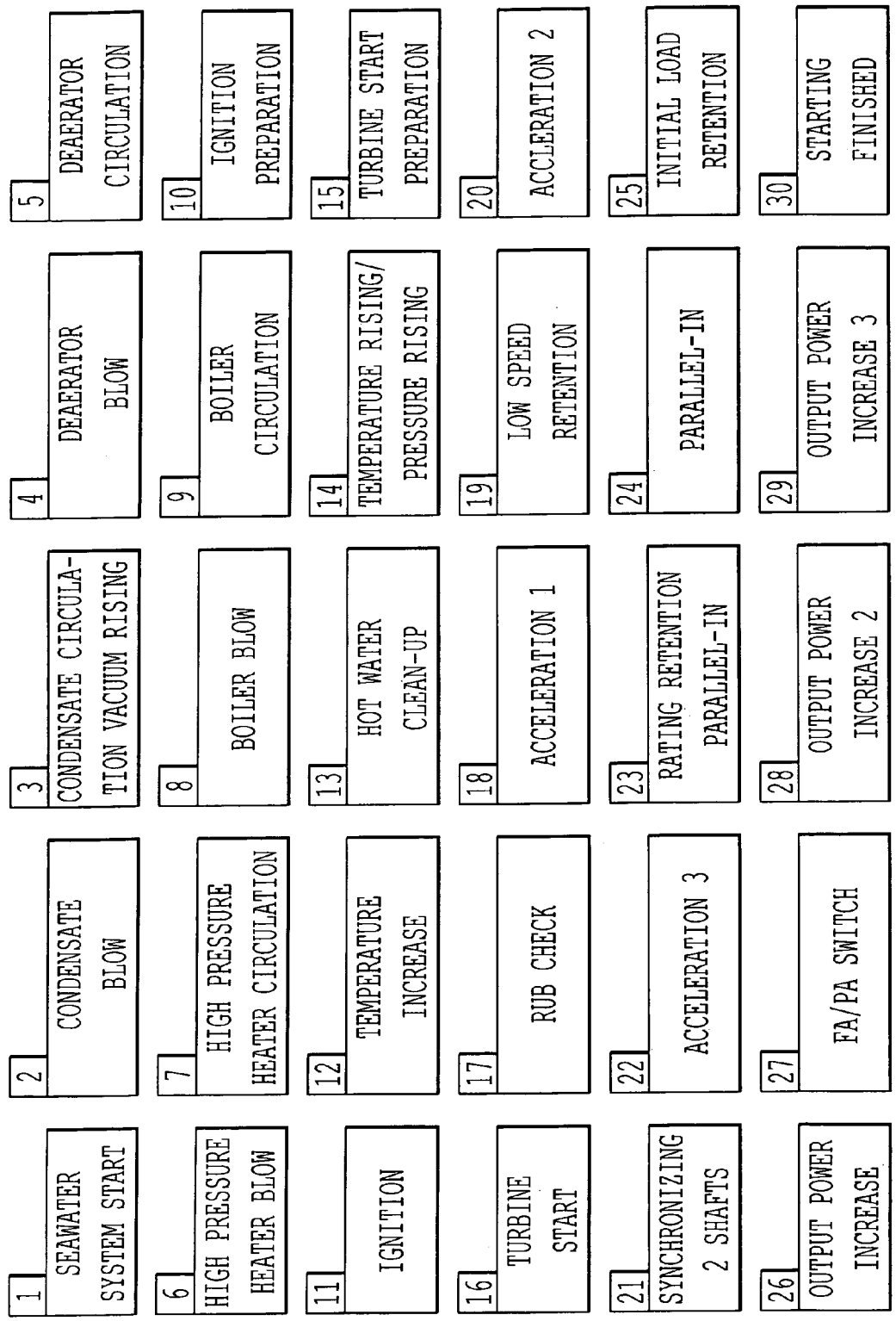
FIG. 10 is a diagram showing the first example of the general automation operation screen pages in the conventional device.
Figure 11:
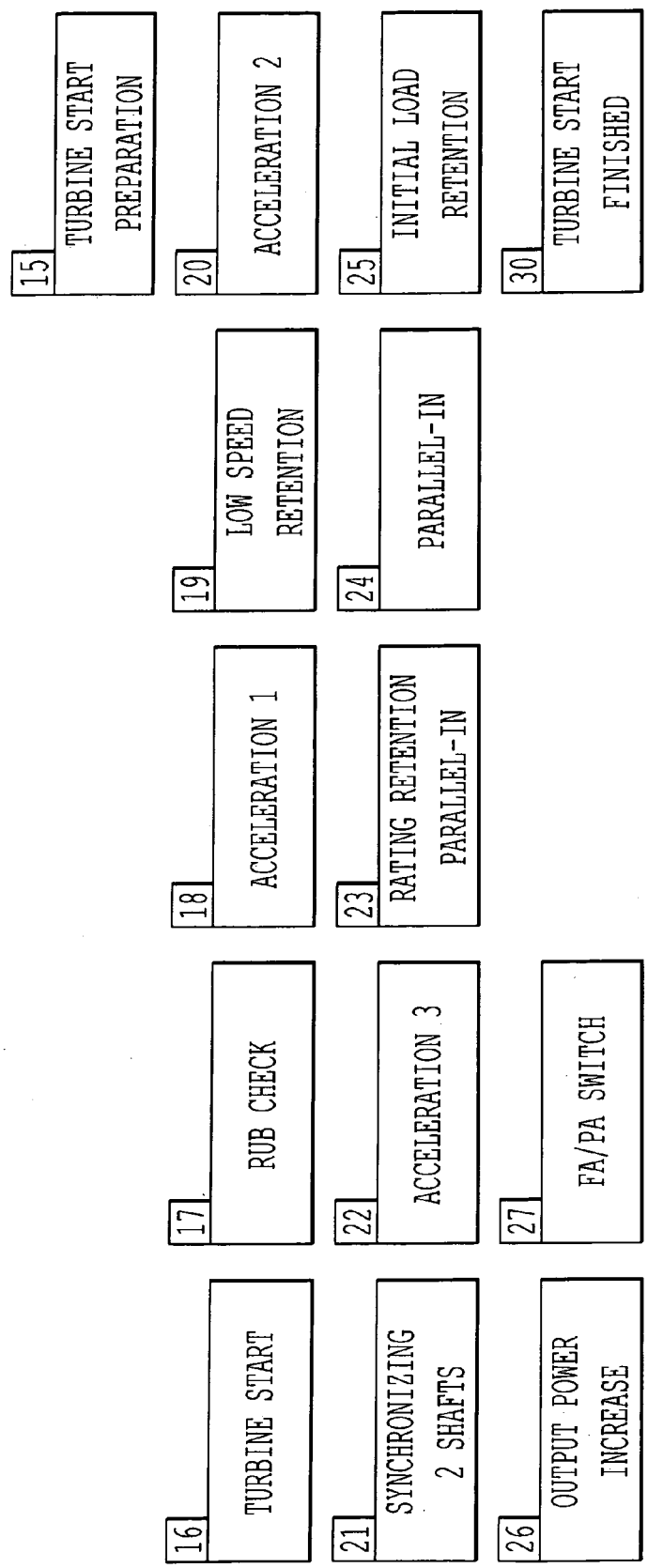
FIG. 11 is a diagram showing the second example of the general automation operation screen pages in the conventional device.
Figure 12:
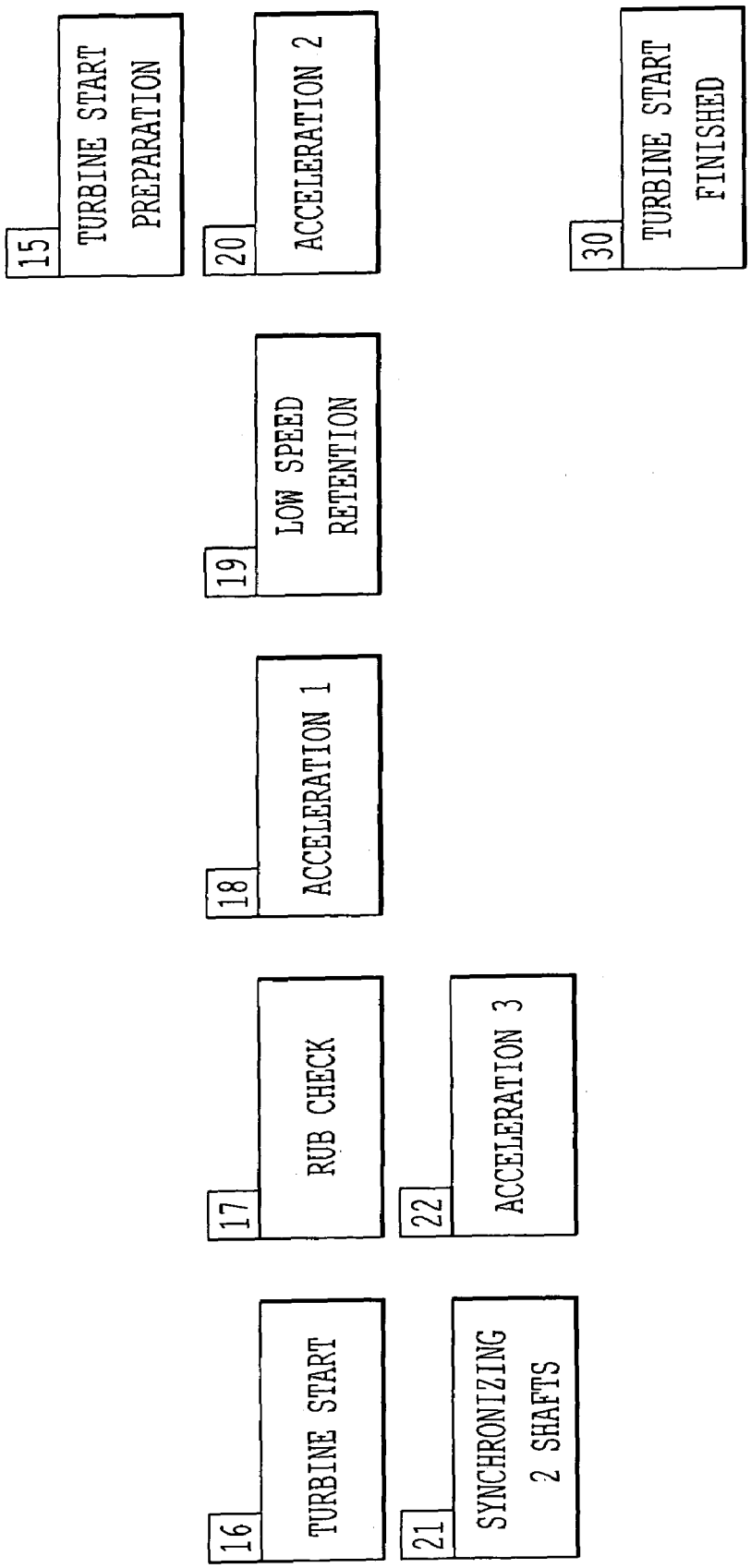
FIG. 12 is a diagram showing the third example of the general automation operation screen pages in the conventional device.

In the electric power plant general control system shown in FIG. 1, the interactive apparatuses $I/F_{1a}$, $I/F_{2a}$, $I/F_{3a}$ and the operation boards $OB_{2a}$, $OB_{3a}$ in FIG. 8 are taken away from the concentrated operation room COR, whereas a general automation computer GAC having an interactive apparatus $I/F_4$ is newly equipped instead. Then the general automation computer GAC is connected with a network NW newly laid down for general automation.

On the other hand, unit input/output devices $I/O_1$, $I/O_2$ and $I/O_3$ are provided between unit computers $UC_1$, $UC_2$, $UC_3$ and the network NW, respectively, in order to connect the unit computers with the network NW in the electric power plant having the power generating units $GU_1$, $GU_2$, and $GU_3$. Consequently, the general automation computer GAC in the concentrated operation room COR and the unit computers $UC_1$, $UC_2$, $UC_3$ are connected together through the network NW.

Though the interactive apparatus $I/F_1$, $I/F_2$, $I/F_3$ for the respective power generating units are equipped in FIG. 1, these interactive apparatuses need not to be operated as the fundamental operation, so that shadowed operators $OP_1$, $OP_{2a}$, $OP_{2b}$, $OP_{3a}$ are usually not required. Moreover, the operation board $OB_2$ in the vicinity of the power generating unit $GU_2$ is not necessary to be operated at the site.

As mentioned above, the power generating unit $GU_1$ is constructed as a so-called full automatic power generating unit. Therefore, when the operator $OP_4$ in the concentrated operation room COR outputs the operator command $In_4$ for the power generating unit $GU_1$ into the general automation computer GAC through the interactive apparatus $I/F_4$, the general automation computer GAC outputs the operation signal $S_1$ into the unit computer $UC_1$ through the network NW and the unit input/output device $I/O_1$.

In this case, the operation signal $S_1$ is configured to be the same signal as the operator command $In_1$ that is given by the operator $OP_1$ with the interactive apparatus $I/F_1$ of his/her power generating unit. As a result, although the unit computer $UC_1$ has received the operation command $In_4$ from the operator $OP_4$ in the concentrated operation room COR, the unit computer $UC_1$ judges the command as if it is the operator command $In_1$ from the operator $OP_1$ of his/her power generating unit, and goes ahead with the automatic control program and carries out in sequence operations of breakpoints to be hereinafter described.

The operation board $OB_2$ equivalent to the operation board $OB_2$ described in FIG. 8 is provided between the unit input/output device $I/O_2$ and the power generating unit $GU_2$, because the power generating unit $GU_2$ is lower than the power generating unit $GU_1$ with respect to the level of automatic control.

When the operator $OP_4$ in the concentrated operation room COR also inputs the operator command $In_4$ into the general automation computer GAC with the interactive apparatus $I/F_4$ directed to the power generating unit $GU_2$, the general automation computer GAC outputs the operation signal $S_{21}$ into the unit input/output device $I/O_2$ and outputs the operation signal $S_{22}$ into the operation board $OB_2$ through the network NW.

The unit computer $UC_2$ proceeds with the automatic control program of the power generating unit $GU_2$ based on the operation signal $S_{21}$ like the case of the power generating unit $GU_1$, and carries out sequentially operations of the breakpoints.

However, operation of the auxiliaries excluded from the objects of automatic control based on the automatic control program is carried out, as if the operator $OP_{2b}$ in his/her power generating unit operates the operation board $OB_2$ by means of the operation signal $S_{22}$ outputted to the operation board $OB_2$.

Namely, the operation signal $S_{22}$ given to the operation board $OB_2$ is connected parallel to the contact point of the required operation implement of the operation board $OB_2$, and the result thereof is the same as if the operation implement is operated with the operation board $OB_2$.

Meanwhile, because the power generating unit $GU_3$ does not have the automatic control program in the unit computer $UC_3$ to operate automatically the auxiliaries, the unit computer $UC_3$ is connected with the unit input/output device $I/O_3$ in order to let the unit computer have functions as a monitor of the power generating unit $GU_3$ and a data logger. Additionally, the center-site linkage support terminal unit $TU_{3b}$ is located adjacent to the operation board $OB_3$, and furthermore the center-site linkage support terminal unit $TU_{3c}$ is located adjacent to the power generating unit $GU_3$ at the site. Then the two terminal units are configured to be connected with the unit input/output device $I/O_3$.

These center-site linkage support terminal units $TU_{3b}$ and $TU_{3c}$ are provided with speakers for audio output as well as display devices and printers for printing, etc. if necessary.

As a result of the configuration mentioned above, the operation signals from the general automation computer GAC are inputted into the center-site linkage support terminal units $TU_{3b}$ and $TU_{3c}$ through the unit input/output device $I/O_3$, then the terminal units output the operation contents corresponding to the inputs thereof. Therefore, when the operator $OP_4$ inputs an operator command $In_4$ (for example, proceeding permission command) into the general automation computer GAC through the interactive apparatus $I/F_4$ in the concentrated operation room, the general automation computer GAC outputs the operation signal $S_3$ based on the operator command $In_4$, then outputs it into the unit computer $UC_3$ through the unit input/output device $I/O_3$ via the network NW, and also outputs the operation contents into the display devices of the center-site linkage support terminal units $TU_{3b}$ and $TU_{3c}$ as well.

Thanks to the system of the embodiment configured above, auxiliary of the power generating units $GU_1$ and $GU_2$ are automatically operated by the operation signals $S_1$ and $S_2$ in the unit computers $UC_1$ and $UC_2$, respectively. On the other hand, because the operator command $In_4$ inputted through the interactive apparatus $I/F_4$ for the power generating unit $GU_3$ is displayed on the display devices of the center-site linkage support terminal units $TU_{3b}$ and $TU_{3c}$, the operators $OP_{3b}$ and $OP_{3c}$ operate manually the respective auxiliaries in accordance with the display contents.

Now, the method to realize the case of general automation control of a plurality of power generating units by combining them together will be explained.

Figure 2:
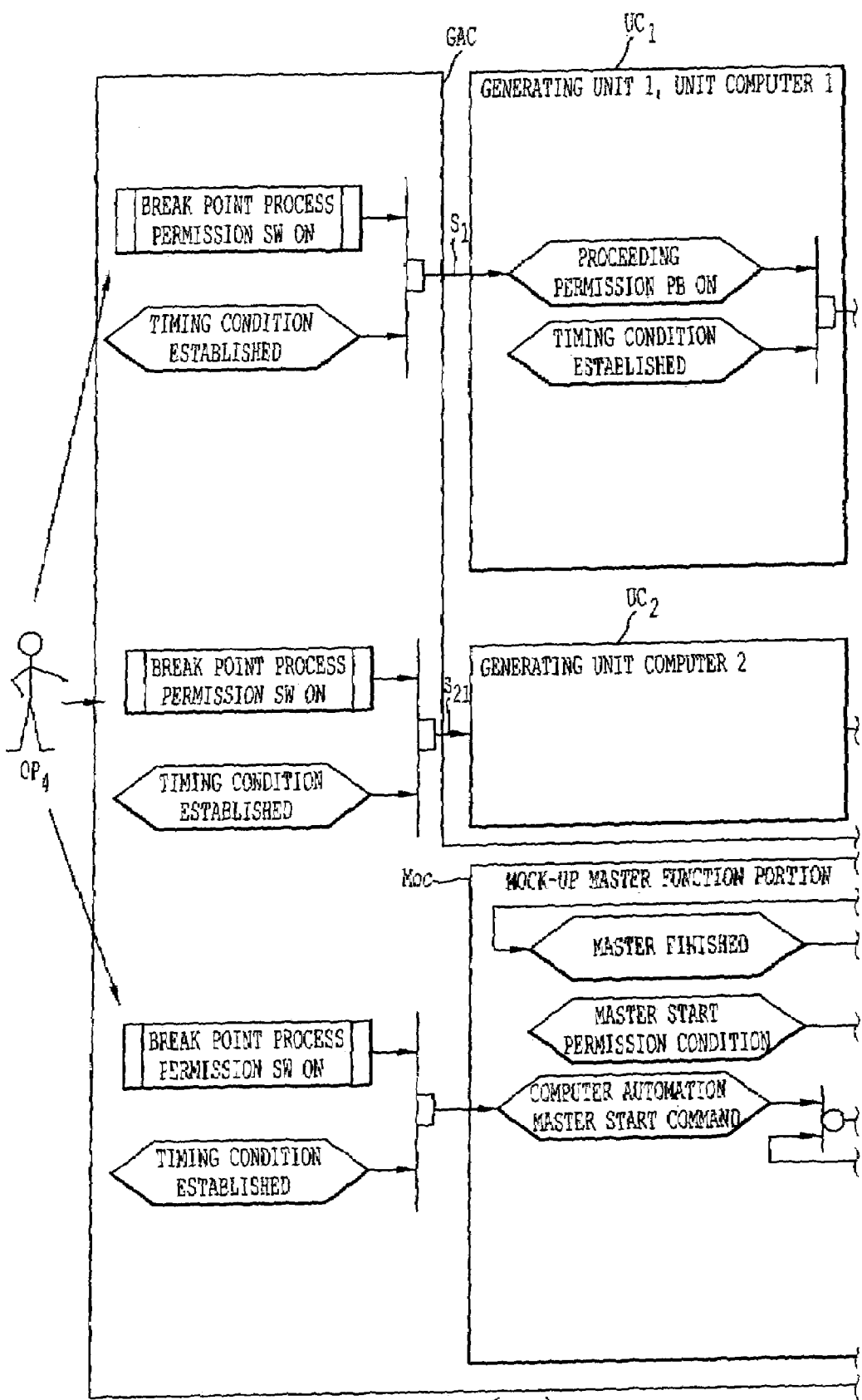
FIG. 2 is a diagram showing the control sequence in the case of controlling generally and automatically the first and the second power generating units shown in FIG. 1.
Figure 2:
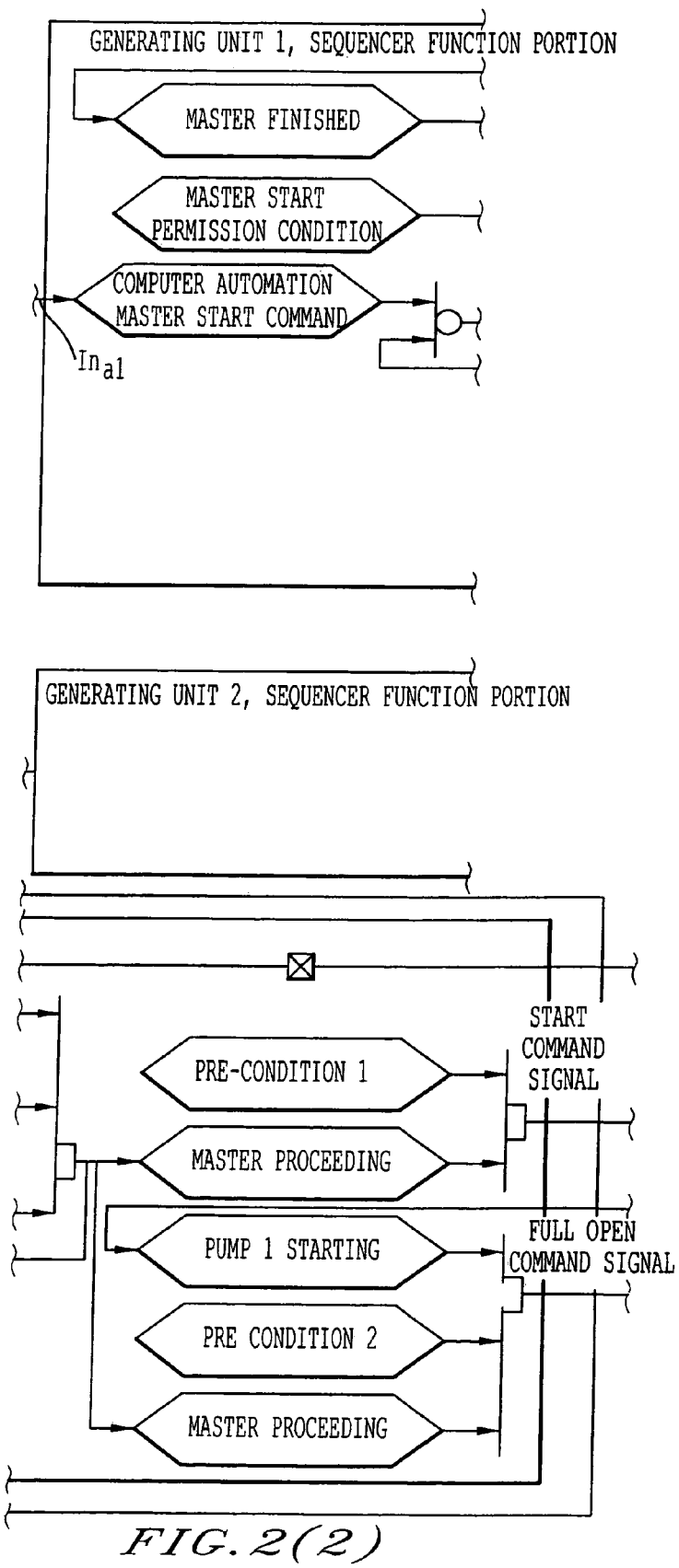
Figure 2:
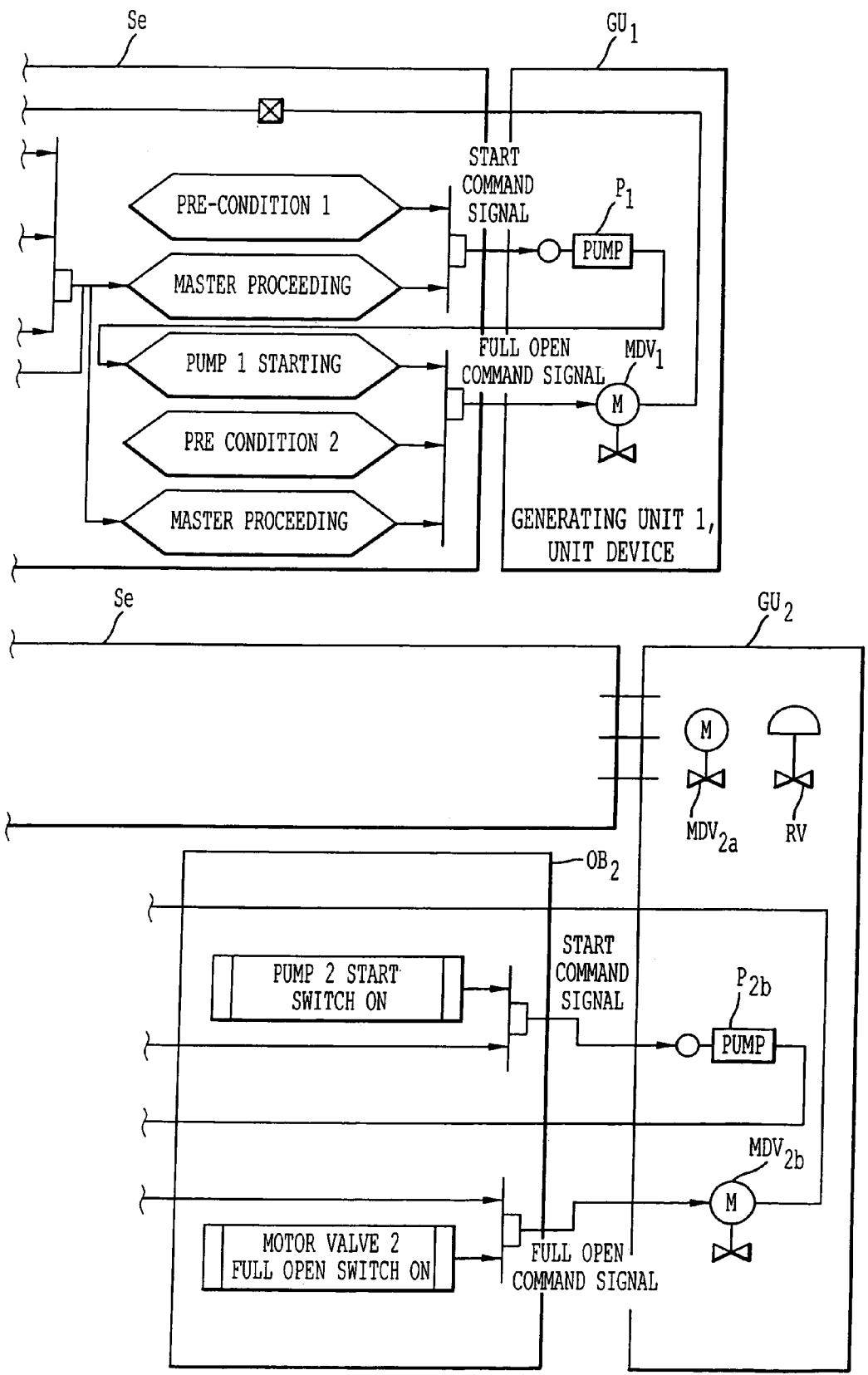

FIG. 2 is a diagram showing an example of the method to realize general automation of the power generating unit $GU_1$ and the power generating unit $GU_2$ by combining them together. In FIG. 2, the top portion thereof shows the sequence circuit operating the power generating unit $GU_1$ by the operator command $In_4$ from the general automation computer GAC through the unit computer $UC_1$. The middle portion thereof shows the sequence circuit operating the power generating unit $GU_2$ by the operator command $In_4$ from the general automation computer GAC through the unit computer $UC_2$, although details thereof are eliminated because this portion is quite the same as the top portion. The bottom portion thereof shows the sequence circuit operating the power generating unit $GU_2$ by the operator command $In_4$ from the general automation computer GAC through the operation board $OB_2$.

Hereinafter, explanation will be carried out in sequence starting from the top portion of FIG. 2. The general automation computer GAC outputs the operation signal $S_1$ when "breakpoint process permission switch (SW) is ON" and "timing condition is established". The output signal $S_1$ is inputted into the unit computer $UC_1$, which outputs the automation command $In_{a1}$ as well when the "AND condition" i.e. "timing condition is established" and "breakpoint process permission switch (SW) is ON" is established.

The automation command $In_{a1}$ forms "computer automation master start command" at the sequencer function portions Se in the control units $CU_{1a}$, $CU_{1b}$. In this specification and the drawings, "master" means sequence master that controls sequence of individual action. When the "master start permission condition" is established and the condition "master finished" is established by feedback from the motor drive valve of the power generating unit $GU_1$, the sequencer function portions Se operate the logic circuit "master is proceeding". In FIG. 2, "X" mark located before shifting from "motor drive valve $MDV_1$ working" toward the "master finished" represents "NOT" (denial), which means that shifting toward the "master finished" takes place after the "motor drive valve $MDV_1$ working" is finished and the motor drive valve $MDV_1$ does not work.

When "AND" condition between the condition "master is proceeding" and the other conditions (precondition 1) is established, "start command signal" is outputted into the pump $P_1$. Moreover, when the condition of "pump $P_1$ is starting" and various conditions of e.g. the "master is proceeding" exist simultaneously, "full open command signal" is outputted to the motor drive valve $MDV_1$.

The explanation above is the contents of the operation toward the power generating unit $GU_1$ by means of the unit computer $UC_1$ provided with the full automatic control program.

General automation control of the power generating unit $GU_2$ will be explained next. Because the contents of the operations executed by the unit computer $UC_2$ trough the control units $CU_{2a}$, $CU_{2b}$ out of the operations for the power generating unit $GU_2$ by the general automation computer GAC are equivalent to the cases by the unit computer $UC_1$, the sequence circuit and explanation of the functions thereof will be omitted by drawing boxes denoted by the same element names and marks in FIG. 2.

The auxiliaries which are not controlled by the unit computer $UC_2$, (i.e. pump $P_{2b}$, motor drive valve $MDV_{2b}$), are set to be controlled by the operation board $OB_2$ out of the auxiliaries of the power generating unit $GU_2$. To automatize generally the operation by the operation board $OB_2$ from the general automation computer GAC, it is necessary that a function corresponding to the sequencer function part Se should be disposed somewhere. In the case of the bottom part of FIG. 2, an example where the function corresponding to the sequencer function part Se is provided in the general automation computer GAC.

Providing the general automation computer GAC with all over a mock-up master function portion Moc corresponding to the sequencer function part Se, "start command signal" is outputted to the operation board $OB_2$ from the mock-up master function portion Moc. The "start command signal" is outputted to the pump $P_{2b}$ of the power generating unit $GU_2$ after the AND-condition between the "start command signal" and the "pump 2 start switch-on" is established.

When the feedback signal from the pump $P_{2b}$ is inputted into the mock-up master function portion Moc, the logic of "pump 2 starting" becomes "ON" state, and the "full open command signal" is outputted into the operation board $OB_2$ from the mock-up master function portion Moc after the "master proceeding" and the "precondition 2" are established. Then the "full open command signal" outputs the "full open command signal" to the motor drive valve $MDV_{2b}$ of the power generating unit $GU_2$ and operates the motor drive valve $MDV_{2b}$ in "open" direction, when the "AND" condition between the "full open command signal" and the "motor drive valve $MDV_2$ full open switch-on" is established in the operation board $OB_2$. Operation result input of the working conditions of the motor drive valve $MDV_{2b}$ by the operator or the detection result of process quantity by a detector (not shown) is fed back to the mock-up master function portion Moc of the concentrated operation room through the network NW. The feedback signal is displayed on the interactive apparatus $I/F_4$ in the concentrated operation room and recognized out by the operator.

In accordance with this embodiment as mentioned above, even in the electric power plant in which a part of the auxiliaries are controlled automatically by the unit computer and the remaining auxiliaries are controlled manually by the operator with the operation board, general control from the concentrated operation room can be available by providing the manual control system with a mock-up master function portion corresponding to the sequencer function part provided in the automatic control system.

Though the mock-up master function portion Moc is equipped in the general automation computer GAC in the explanation mentioned above, it can be equipped in the power generator unit $GU_2$ or the vicinity thereof. In general, because connection points between the mock-up master function portion Moc and the man-machine interface function side (e.g. breakpoint proceeding permission switch) of the general automation computer GAC are less than connection points between the power generator unit $GU_2$ and the mock-up master function portion Moc, number of transmission or cables can be diminished if the mock-up master function portion Moc is located in the power generating unit $GU_2$ or the vicinity thereof.

The case of general automation of the power generating units $GU_1$ and $GU_2$ was explained hereinabove. The general automation can eliminate operators $OP_1$, $OP_{2a}$ and $OP_{2b}$.

It should go without saying that the present invention can also be applied to the case of the general automation computer GAC connected with only one power generating unit $GU_2$ of low level automation instead of combining with the full automatic power generating unit $GU_1$.

Now, an example of general automation control of the power generating unit $GU_1$ combined with the power generating unit $GU_3$ will be explained referring to FIG. 3.

Figure 3:
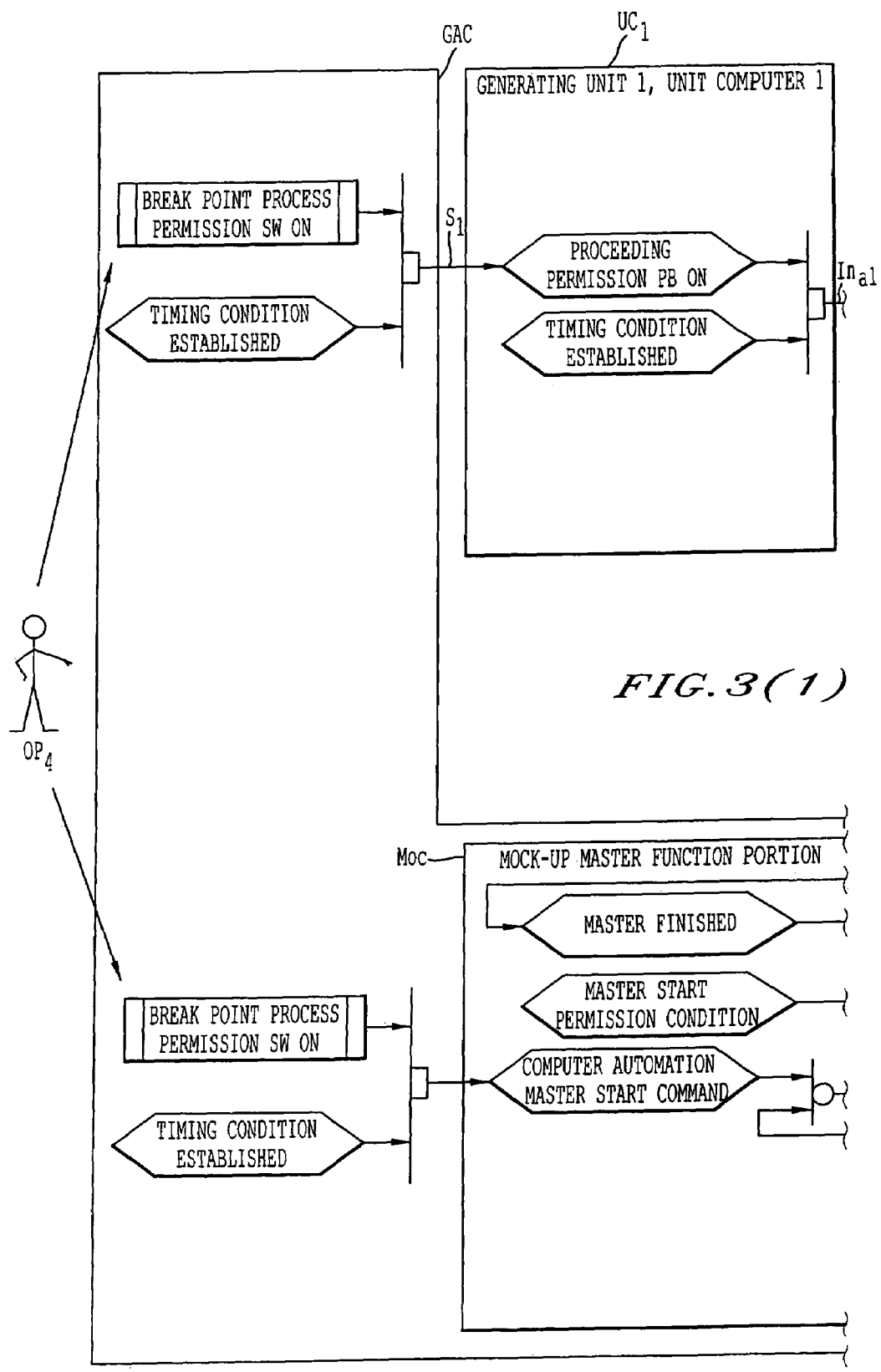
FIG. 3 is a diagram showing the control sequence in the case of controlling generally and automatically the second and the third power generating units shown in FIG. 1.
Figure 3:
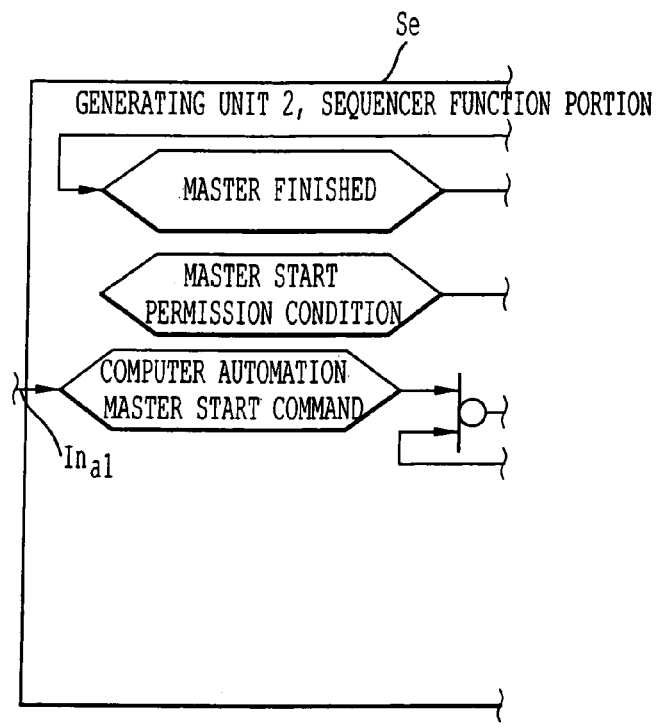
Figure 3:
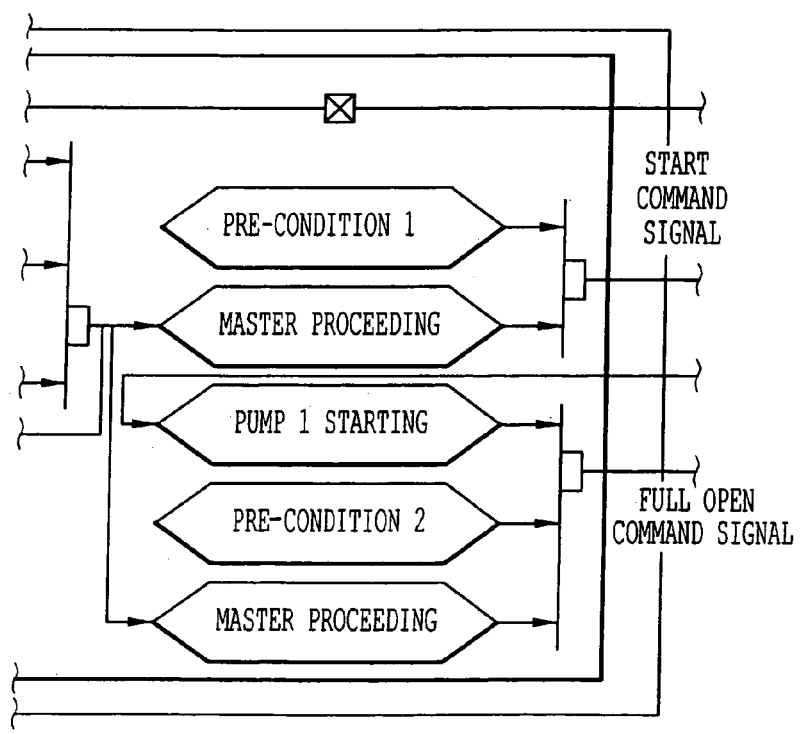
Figure 3:
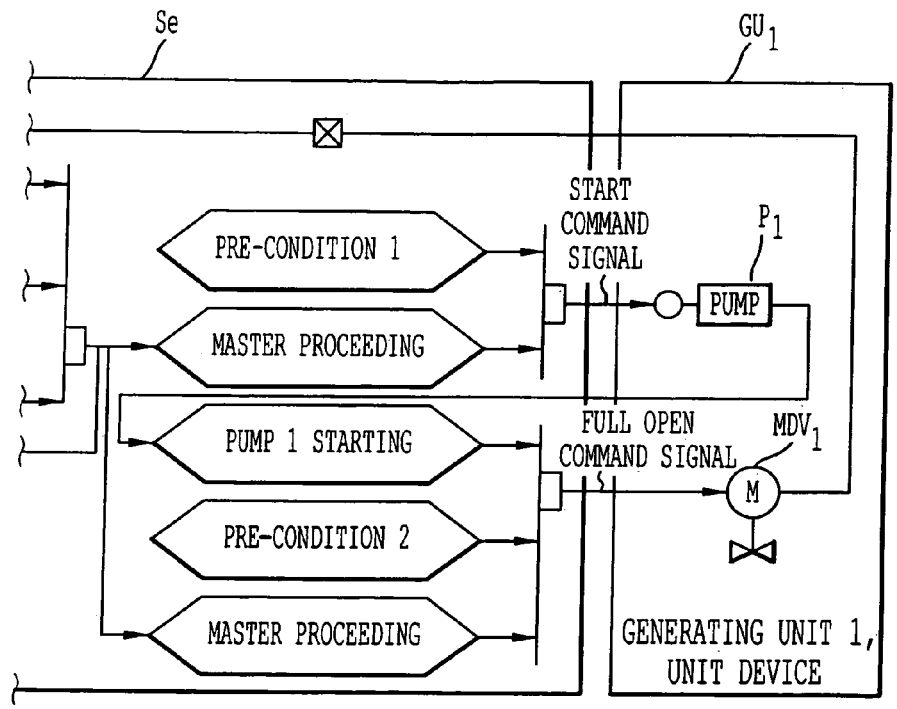
Figure 3:
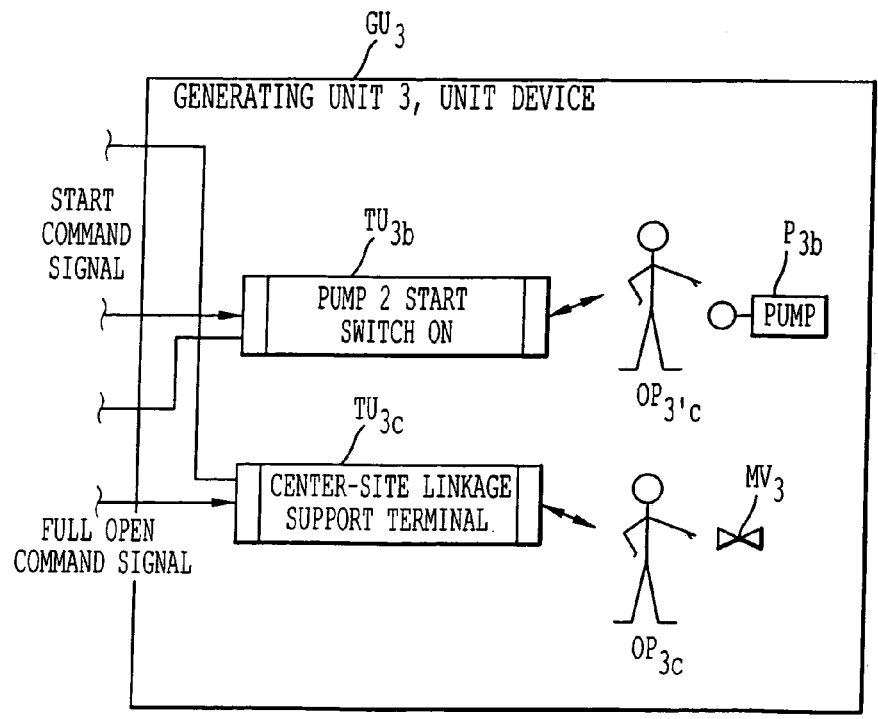

In FIG. 3, the top part of the page is the sequencer function portion Se operating directly the power generating unit $GU_1$ by the operator command $In_4$ from the general automation computer GAC through the unit computer $UC_1$, and the explanation thereof will be omitted because the sequencer function portion Se is the same portion as the top part of FIG. 2. The bottom part of FIG. 3 shows the sequence circuit operating the power generating unit $GU_3$ by the operator command $In_4$ from the general automation computer GAC through the center-site linkage support device terminals $TU_{3b}$ or $TU_{3c}$.

For the bottom part as well, the operation signal $S_3$ corresponding to all operations of the all breakpoints of the power generating unit $GU_1$ is outputted to the center-site linkage support device terminal $TU_{3b}$ (or $TU_{3c}$) from the general automation computer GAC by providing the general automation computer GAC with the mock-up master function portion Moc corresponding to the aforementioned sequencer function portion Se.

Namely, the start command signal is outputted to the center-site linkage support device terminal $TU_{3b}$ (or $TU_{3c}$) from the mock-up master function portion Moc provided in the general automation computer GAC as mentioned above. Then, the contents of the "start command signal" are displayed on the display device of the center-site linkage support device terminal $TU_{3b}$ (or $TU_{3c}$) to inform the operator $OP_{3c}$ of the contents. The operator $OP_{3c}$ starts manually the pump $P_3$ in compliance with the contents displayed on the display device, and inputs the information of the pump $P_3$ started into the center-site linkage support device terminal $TU_{3b}$ (or $TU_{3c}$).

The result of the manual operation by the operator $OP_{3b}$ is fed back to the mock-up master function portion Moc disposed in the general automation computer GAC. Thereby the logic of "pump 1 starting" turns on, and the "full open command signal" is outputted to the center-site linkage support device terminal $TU_{3b}$ (or $TU_{3c}$) and displayed on the display device when the logic condition of the "precondition 2" and the "master being in progress" is established.

The operator $OP_{3b}$ carries out again full open operation of the manual valve MV in compliance with the command of the display. By inputting the operation result, it is fed back to the mock-up master function portion Moc disposed in the general automation computer GAC. Thus, the general automation signal from the general automation computer GAC is outputted to the center-site linkage support device terminal $TU_{3b}$ (or $TU_{3c}$) to command the manual operation. When the feedback signal as the result of the manual operation returns, contents of the next operation are commanded and the result of the manual operation is urged to be inputted.

A sequence of the operation commands and the operation results are displayed on the interactive apparatus $I/F_4$ in the concentrated operation room so as to be able to be grasped by the operator $OP_4$.

As mentioned above, even in the power generating unit $GU_3$ without the sequencer function portion Se and operated manually by an operator with the operation board, the same interface as the power generating unit $GU_1$ can be supplied for the operator $OP_4$ operating via the general automation computer GAC because the mock-up master function portion is provided in the general automation computer GAC in the concentrated operation room and communication with the site is carried out through the center-site linkage support device terminal.

Figure 4:
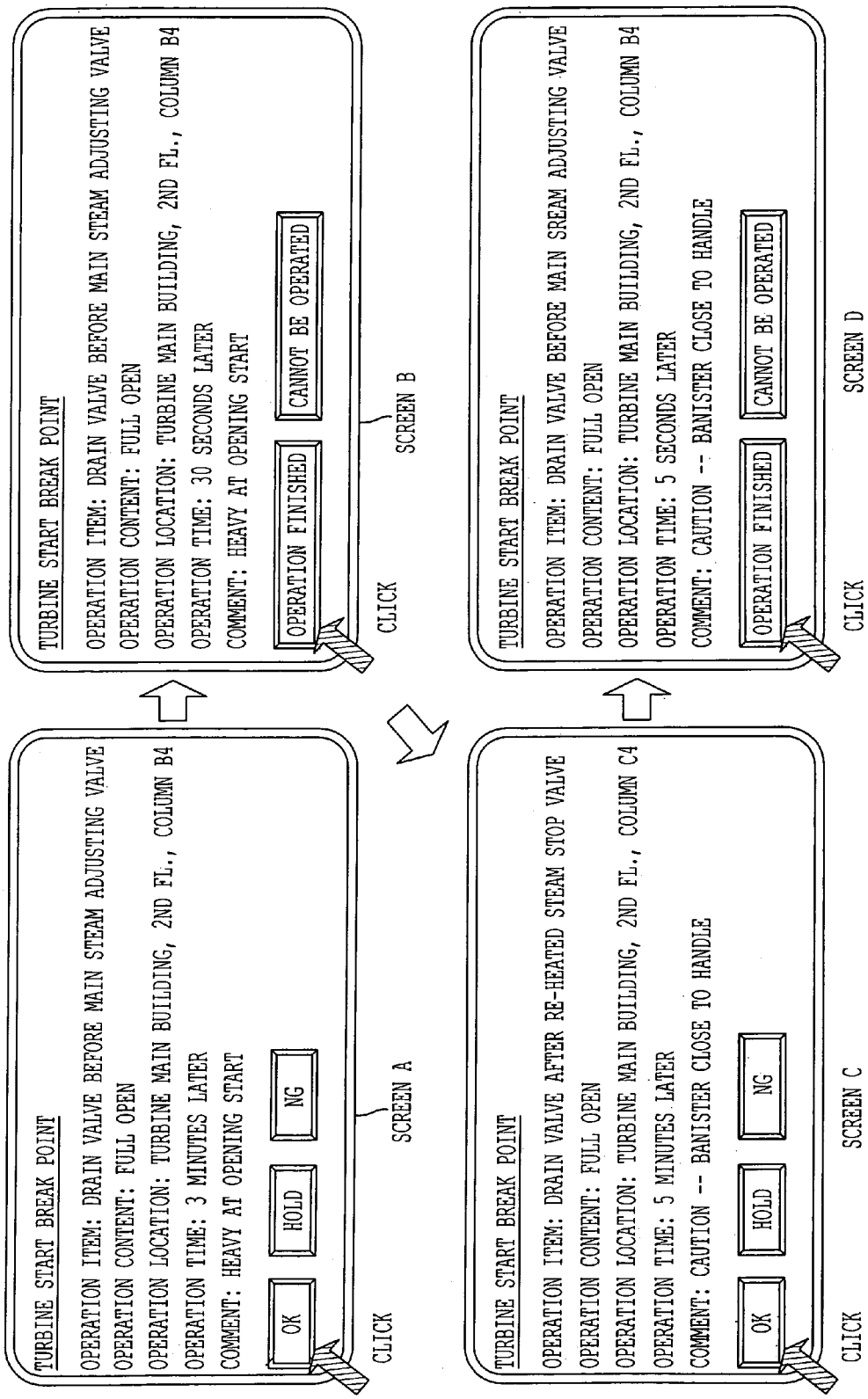
FIG. 4 is a diagram showing an example of transition of terminal screen of the center-site linkage support terminal unit according to the present invention.

FIG. 4 is a diagram showing an example of display screen transition for every breakpoint of the center-site linkage support device terminal $TU_{3b}$ (or $TU_{3c}$) explained in FIG. 3. The example displayed shows the part displaying execution of the operation that the drain valve before the main steam regulation valve is fully opened at the turbine start break point and then the drain valve after the reheat steam stop valve is fully opened.

The screen A is displayed by means of the mock-up master function portion Moc as shown in FIG. 3 when the drain valve before the main steam regulation valve is fully opened. In Screen A, operation item, contents thereof, operating place, estimated time, etc. are displayed. The operator $OP_{3c}$ accepts the contents thereof and clicks "OK" button. Then the display screen proceeds to Screen B.

The operator $OP_{3c}$ operates actually the auxiliaries, then clicks "operation finished" button. This operation serves as the full open limit switch of the valve, and is fed back to the general automation monitoring system side of the concentrated operation room, and thereafter proceeds to Screen C. In the same way, the operator $OP_{3c}$ pushes the "OK" button to proceed to Screen D, and then makes progress in sequence to the next operation after the "operation finished" button is pressed when the operation has finished. Some notice items etc. can also be displayed on the screens as "special notes".

In this way, indispensable operator $OP_{3a}$ so far can be eliminated by controlling the power generating unit without automation control program by the aid of general automation computer GAC.

In the above explanation, the operator $OP_{3c}$ inputs the feedback of the operation result, but the contact signal representing "operating" from the main machine or the limit switch equipped in the auxiliaries may be inputted via the unit input/output device $I/O_3$ and may be fed back.

Although the center-site linkage support device terminals $TU_{3b}$, $TU_{3c}$ are connected with the unit input/output device I/O in FIG. 1, necessary signals may be inputted and/or outputted directly from/into the general automation computer GAC via the network NW. Needless to say, signals can be directly inputted and/or outputted from/into the general automation computer GAC without going through the network NW.

The center-site linkage support device terminal $TU_{3b}$ (or $TU_{3c}$) may be portable for the operator $OP_{3a}$ (or $OP_{3c}$) in order to transmit signals to the unit input/output device $I/O_3$ or receive signals therefrom by wireless. Naturally, necessary signals can be inputted and/or outputted by connecting with the general automation computer GAC directly or via the network NW without going through the unit input/output devices.

Moreover, separating the display-input portion from the main body of the center-site linkage support device terminal TU$_{3b}$ (or TU$_{3c}$), data transmission between the display-input portion and the main body may be carried out by wireless.

By making the center-site linkage support device terminal be a wireless system like the above, operationality can be further improved compared to fixed type or cable type because it can be brought in the vicinity of the site where the auxiliaries are located.

Now, an example of concept about the general automation operation screen will be explained referring to FIG. 5. The top portion of the figure shows the range of breakpoints displayed on the general automation operation screens according to the present invention. The breakpoints make progress in sequence from "seawater system start" on the left side of the figure to "start finished" on the right side of the figure via "condensate circulation vacuum rising", "output power increase", etc. The bottom portion of the figure shows the conventional breakpoints included in the breakpoints displayed on the general automation operation screen. Each breakpoint in the top line thereof includes breakpoints displayed in the second and all the following lines. Taking the power generating unit GU$_1$ as an example, three breakpoints of "(1) seawater system start", "(2) condensate blow" and "(3) condensate circulation vacuum rising" in the conventional technology become two breakpoints of "[1] seawater system start" and "[2] condensate circulation vacuum rising" in the general automation of the present invention. In this case, "[2] condensate circulation vacuum rising" in the general automation includes "(2) condensate blow" and "(3) condensate circulation vacuum rising" in the power generating unit GU$_1$.

Furthermore, seven breakpoints from "(4) deaerator blow" to "(10) ignition preparation" via "(5) deaerator circulation", "(6) high pressure heater blow", etc. in the conventional technology are integrated into one breakpoint "[3] boiler start" in the present invention.

Regarding to the power generating unit GU$_1$, plural breakpoints in the conventional technology are integrated into one breakpoint in the case of general automation according to the present invention, also for each following breakpoints as shown in the figure.

Figure 5:
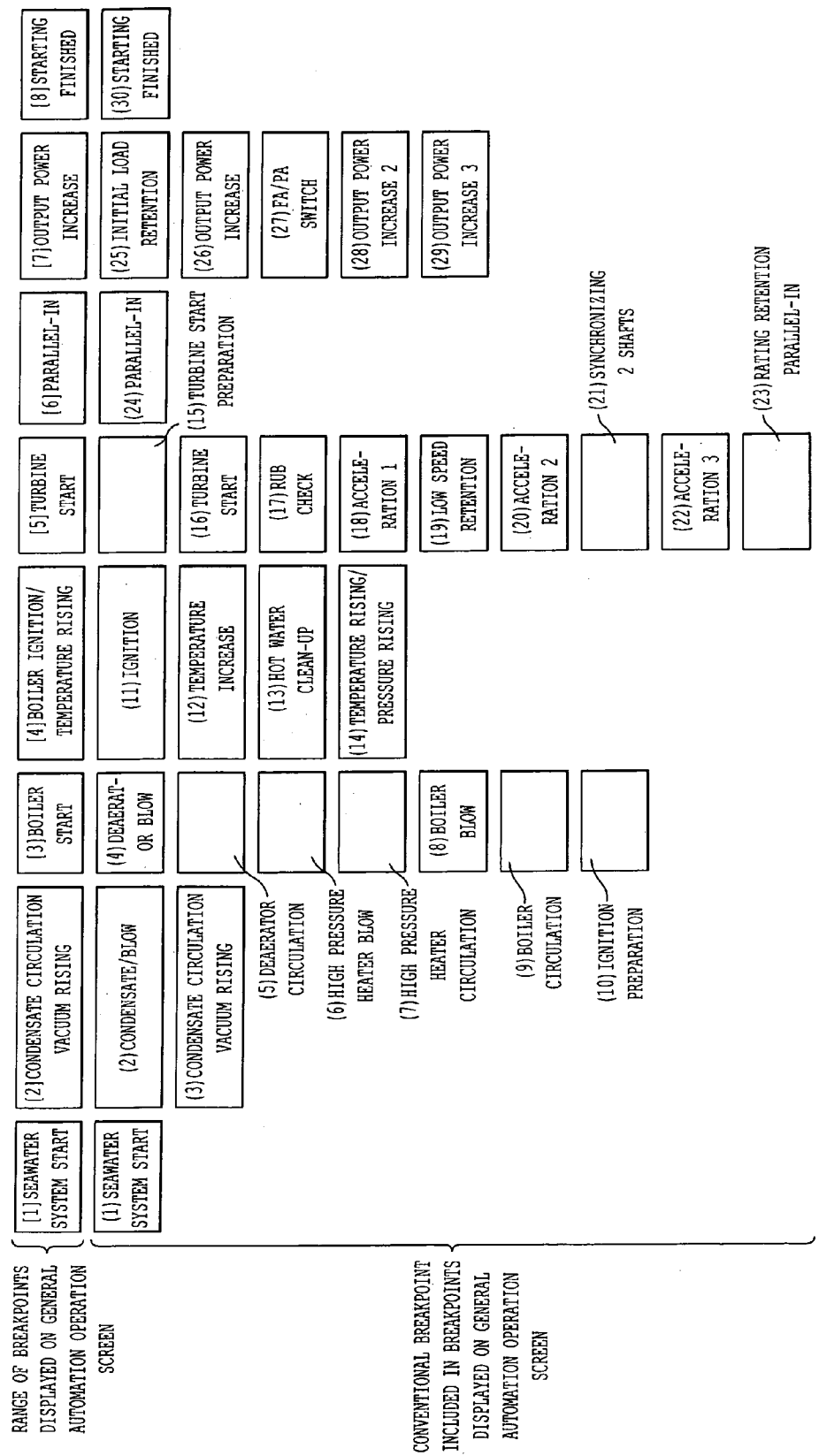
FIG. 5 is a diagram showing an example of the general automation operation screen pages according to the present invention.

In FIG. 5, "range of the breakpoints displayed on the general automation operation screen" in the top line thereof represents the breakpoints of the screen which the general automation computer GAC displays on the interactive apparatus I/F$_4$. On the other hand, "conventional breakpoints included in the breakpoints displayed on the general automation operation screen" in the second line and all the following lines describe the breakpoints in the power generating unit GU$_1$ included in the respective breakpoints of "range of the breakpoints displayed on the general automation operation screen" described above.

Figure 6:
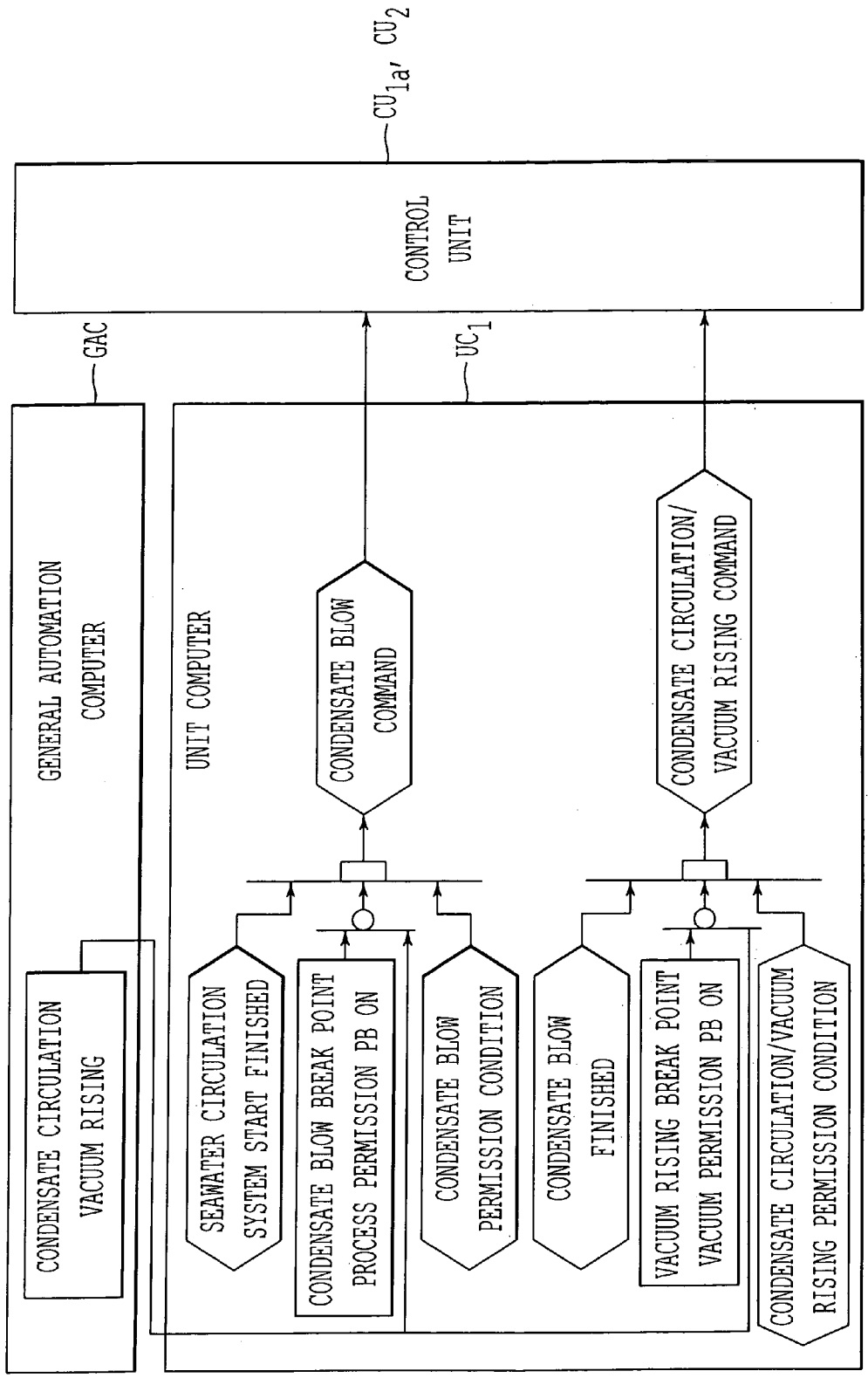
FIG. 6 is a sequence diagram showing an example merging breakpoints according to general automation in the present invention.

FIG. 6 is a diagram showing a part of an automatic control program circuit of the general automation breakpoint that packs several breakpoints. The circuit is configured in order that the operator command In$_4$ given to the general automation computer GAC by the operator OP$_4$, which corresponds to "condensate circulation vacuum rising operation check PB-ON" at the condensate circulation vacuum rising breakpoint, may be given to the unit computer UC$_1$ as the operation signal "1", and then inputted into the "condensate blow operation check PB-ON" signal and the "condensate circulation vacuum rising operation check PB-ON" signal under "OR" condition.

The operation permission given to the condensate circulation vacuum rising breakpoint of the general automation control program by the operator OP$_4$ as mentioned above becomes the operation permission of the "condensate blow command" breakpoint and the "condensate circulation vacuum rising command" breakpoint for the unit computer UC$_1$.

Because these breakpoints are out of the range of the automation control program in the power generating unit GU$_2$, the operation itself is configured by the general automation control program and executed in sequence.

Furthermore, a control device (including the seawater system start master) corresponding to the control devices CU$_{1a}$, CU$_{1b}$ may be provided as a sub-loop device of the power generating unit GU$_2$ or the general automation computer GAC, to output the automation command thereto.

Just like the power generating unit GU$_3$, it is possible that the center-site linkage support device terminal is provided so as to operate the operation board out of the operation range of the automation control program by an operator at the site.

Figure 7:
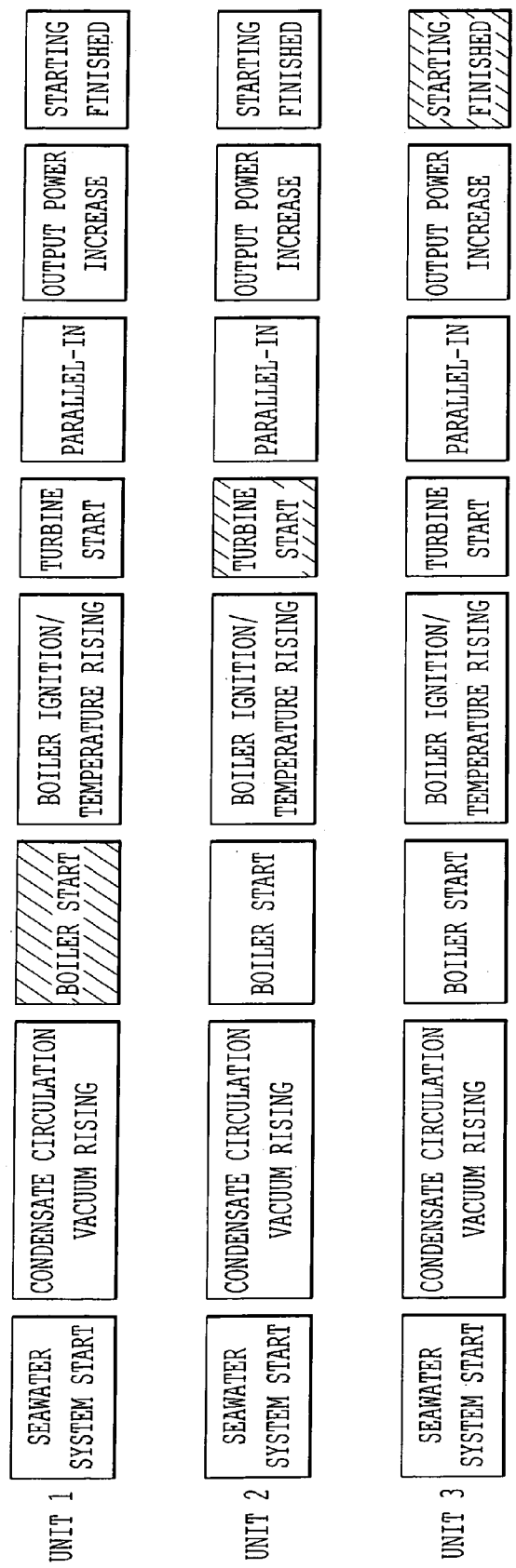
FIG. 7 is a diagram showing an example of the general automation operation screen pages according to the present invention.

FIG. 7 shows an example of a screen in the case of general automation operation of the power generating units GU$_1$, GU$_2$, GU$_3$ equipped with general automation function. That is, breakpoints of respective power generating units GU$_1$, GU$_2$, GU$_3$ are listed. The portions with halftone dot meshing in FIG. 7 represent breakpoints currently proceeding of the power generating units GU$_1$, GU$_2$, GU$_3$. On an actual display screen, it can be differentiated instantly by changing the color or inverting black and white. Thus, even if the power generating units GU$_1$, GU$_2$, GU$_3$ are different from each other in automation level, respective automation operation screens become uniform by the general automation.

INDUSTRIAL APPLICABILITY

As mentioned above, the electric power plant general control system in accordance with the present invention is suitable to operate efficiently and safely a plurality of power generating units by relatively small number of persons.

What is claimed is:

1. An electric power plant general control system comprising:
   a power generating unit having plural auxiliaries, a subset of the plural auxiliaries being operated based on an automation command outputted from a unit computer having a sequence function portion, and the remaining auxiliaries in the plural auxiliaries being operated based on an operation command outputted from an operation board without a sequence function portion, the operation board disposed separately from the unit computer;
   a general automation computer connected with an upper system of the unit computer and configured to receive an operator command inputted from an interactive apparatus and output an operation signal into the unit computer based on the operator command inputted from the interactive apparatus; and
   a control system configured to control the remaining auxiliaries and including a mock-up portion configured to perform a function corresponding to the sequence function portion in the unit computer,
   said control system configured to output the operation signal outputted from the general automation computer into both the unit computer and the operation board and operate all of the plural auxiliaries of the power generating unit.

2. An electric power plant general control system comprising:
   a first power generating unit having first plural auxiliaries, all of the first plural auxiliaries being operated based on an automation command outputted from a first unit computer;

a second power generating unit having second plural auxiliaries, a subset of the second plural auxiliaries being operated based on an automation command outputted from a second unit computer, and the remaining auxiliaries in the second plural auxiliaries being operated based on an operation command from an operation board disposed separately from the second unit computer;

a general automation computer connected with an upper system of the first and the second unit computers and configured to receive an operator command inputted from an interactive apparatus and output an operation signal into the first and the second unit computers based on the operator command inputted from the interactive apparatus; and a control system configured to control the remaining auxiliaries and including a mock-up portion configured to perform a function corresponding to a sequencer function portion configured to output the automation command outputted from the first or the second unit computer, said control system configured to output the operation signal outputted from the general automation computer into both the first and the second unit computers and the operation boards and all of the first and second plural auxiliaries of the first and the second power generating units.

3. An electric power plant general control system comprising:

a first power generating unit having first plural auxiliaries operated based on an automation command outputted from a unit computer;

an operation board outputting an operation command to the first plural auxiliaries;

a second power generating unit having second plural auxiliaries excluded from automatic control and operated based on an operation command outputted from the operation board;

a general automation computer connected with an upper system of the unit computer and configured to output an operation signal based on an operator command inputted from an interactive apparatus;

a center-site linkage support terminal unit outputting information representing operation contents regarding the second plural auxiliaries excluded from automatic control based on an operation signal outputted from the general automation computer; and a control system configured to control the second plural auxiliary and including a mock-up portion configured to perform a function corresponding to a sequencer function portion of the unit computer, output information representing the operation contents on the center-site linkage support terminal unit regarding the second plural auxiliaries, and control all of the first and second plural auxiliaries of the first and the second power generating units by the operation signal outputted from the general automation computer.

4. The electric power plant general control system of any one of claims 1 to 3, wherein the general control system is configured so as to permit operation of a plurality of breakpoints of the unit computer by giving proceeding permission to a breakpoint by the general automation computer.

5. The electric power plant general control system of any one of claims 1 to 3, wherein the general automation computer is configured so as to be connected with the unit computers through a network.

6. The electric power plant general control system of claim 3, wherein an automation operation command in accordance with a predetermined procedure is outputted into the center-site linkage support device terminal, and a feedback signal of the automation operation signal is substituted by an operation finish signal inputted from the center-site linkage support device terminal or an operation finish signal due to process condition changing.

7. The electric power plant general control system of claim 3, wherein the center-site linkage support device terminal outputting the automation operation command to the operator is configured so as to output a voice and a display combined together.

8. The electric power plant general control system of claim 3, wherein at least a part of communications between the center-site linkage support device terminal and the general automation computer is a wireless system.

* * * * *